(12) United States Patent
Su et al.

(10) Patent No.: US 9,170,682 B2
(45) Date of Patent: Oct. 27, 2015

(54) IMAGE PROCESSING METHOD FOR OPTICAL TOUCH SYSTEM

(75) Inventors: Tzung Min Su, Hsinchu (TW); Yu Chia Lin, Hsinchu (TW); Teng Wei Hsu, Hsinchu (TW); Chih Hsin Lin, Hsinchu (TW); Cheng Nan Tsai, Hsinchu (TW)

(73) Assignee: Pixart Imaging Inc., Hsin-Chu (TW)

( * ) Notice: Subject to any disclaimer, the term of this patent is extended or adjusted under 35 U.S.C. 154(b) by 433 days.

(21) Appl. No.: 13/446,896

(22) Filed: Apr. 13, 2012

(65) Prior Publication Data

US 2012/0262423 A1 Oct. 18, 2012

(30) Foreign Application Priority Data

Apr. 14, 2011 (TW) .............................. 100112922 A

(51) Int. Cl.
G06F 3/042 (2006.01)
G06F 3/041 (2006.01)

(52) U.S. Cl.
CPC ............ G06F 3/0421 (2013.01); G06F 3/0416 (2013.01)

(58) Field of Classification Search
USPC .................................................. 345/175, 207
See application file for complete search history.

(56) References Cited

U.S. PATENT DOCUMENTS

| 7,689,381 B2 | 3/2010 | Lin et al. | |
| 2004/0218479 A1 | 11/2004 | Iwamoto et al. | |
| 2005/0190162 A1 | 9/2005 | Newton | |
| 2005/0200613 A1 | 9/2005 | Kobayashi et al. | |
| 2010/0002008 A1* | 1/2010 | Tsuzaki et al. | 345/581 |
| 2011/0122097 A1* | 5/2011 | Tsang et al. | 345/175 |
| 2011/0304588 A1* | 12/2011 | Tsai et al. | 345/175 |
| 2012/0162144 A1* | 6/2012 | Fahraeus et al. | 345/178 |

FOREIGN PATENT DOCUMENTS

| CN | 101369204 A | 2/2009 |
| CN | 101533323 A | 9/2009 |
| CN | 101916150 A | 12/2010 |
| JP | 2001125745 A | 5/2001 |
| TW | 201101148 A | 1/2011 |
| TW | 201112092 A | 4/2011 |
| WO | WO 2011/028169 A1 | 3/2011 |

OTHER PUBLICATIONS

Office Action from Republic of China, Taiwan Patent Office in a corresponding patent application No. 100112922 dated Dec. 23, 2013.

* cited by examiner

*Primary Examiner* — Dwayne Bost
*Assistant Examiner* — Robert Michaud
(74) *Attorney, Agent, or Firm* — Juan Carlos A. Marquez; Bacon & Thomas PLLC

(57) ABSTRACT

An image processing method for an optical touch system includes the steps of obtaining an image and generating a light distribution curve pattern from the image, selecting a target signal of the light distribution curve pattern in accordance with light intensity information of the light distribution curve pattern, determining at least one rising slope and at least one falling slope of the target signal, and selecting the target signal as an object signal when the absolute values of the at least one rising slope and at least one falling slope are greater than a threshold.

22 Claims, 13 Drawing Sheets

IMAGE PROCESSING METHOD FOR OPTICAL TOUCH SYSTEM

CROSS-REFERENCE TO RELATED APPLICATION

The present application is based on, and claims priority from, Taiwan Patent Application Serial Number 100112922, filed on Apr. 14, 2011, the disclosure of which is hereby incorporated by reference herein in its entirety.

BACKGROUND

1. Technical Field

The present invention relates to an image processing method, and relates more particularly, but not exclusively, to an image processing method for an optical touch system.

2. Related Art

Touch screen devices are a type of electronic device that allows users to perform input operations directly on a screen. When a stylus, a finger tip or a similar object touches the screen, the touch screen device detects and calculates the position of the touch point, outputting coordinates to a computing system to allow the computing system to perform subsequent computing operations.

Optical touch screens are a common type of developed touch screen devices. An optical touch screen usually comprises a light source and a camera arranged in a manner such that when an object touches the optical touch screen, an object shadow will be cast on the camera. When no object touches the optical touch screen, the camera may generate an image, which is relied upon to extract a background light intensity waveform pattern 11 as shown in FIG. 1; when an object touches the optical touch screen, the camera will generate an image, which is relied upon to extract a light intensity waveform pattern 12 including a shadow signal 121.

When an object touches the optical touch screen, the manner of light reflection may be changed such that a false signal is generated. For example, an object may deform the screen, causing light to be reflected into the camera and generating a reflected light signal 13, or changing the manner of light reflection and causing a false shadow signal 14. The false shadow signal 14 may be misinterpreted as a signal that is generated by an object. As a result, incorrect object coordinates may be computed, or the number of objects is incorrectly determined and real coordinates of the object are incorrectly calculated.

Therefore, a new method that can avoid the issue of false signals being generated in conventional optical touch screens is needed.

SUMMARY

One embodiment provides an image processing method for an optical touch system. The method comprises obtaining an image and generating a light distribution curve pattern representing the image; determining a target signal of the light distribution curve pattern in accordance with light intensity information of the light distribution curve pattern; determining at least one rising slope and at least one falling slope of the target signal; and selecting the target signal as an object signal when absolute values of the at least one rising slope and the at least one falling slope are greater than a threshold.

Another embodiment provides an image processing method for an optical touch system. The method comprises obtaining a background image and generating a background light distribution curve pattern representing the background image; obtaining an image and generating a light distribution curve pattern representing the image; determining a target signal of the light distribution curve pattern in accordance with light intensity information of the light distribution curve pattern; computing first light intensity information of the target signal; computing second light intensity information of a background signal, corresponding to the target signal, of the background light distribution curve pattern; and selecting the target signal as an object signal if a ratio of the first and second light intensity information is greater than a threshold.

Yet another embodiment provides an image processing method for an optical touch system. The method comprises obtaining a background image and generating a background light distribution curve pattern representing the background image; obtaining an image and generating a light distribution curve pattern representing the image; determining a first target signal and a second target signal of the light distribution curve pattern in accordance with light intensity information of the light distribution curve pattern; computing first light intensity information of the first target signal and second light intensity information of the second target signal; computing third light intensity information of a background signal, corresponding to the first target signal, of the background light distribution curve pattern; computing fourth light intensity information of a background signal, corresponding to the second target signal, of the background light distribution curve pattern; and obtaining a new image if the first light intensity information is greater than the third light intensity information and the second light intensity information is less than the fourth light intensity information.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF DISCLOSED EMBODIMENTS

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

Figure 1:
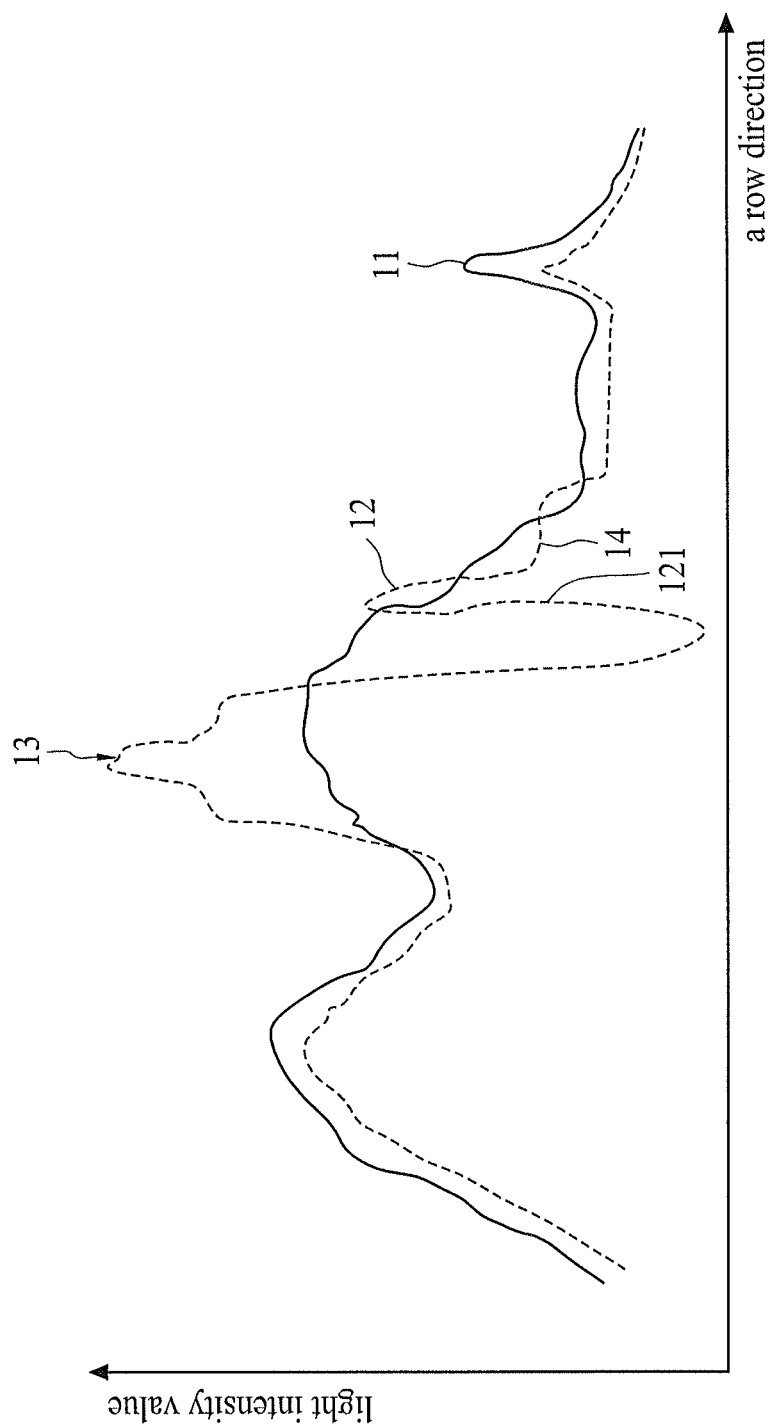
FIG. 1 is a diagram showing a background light intensity waveform pattern and a light intensity waveform pattern of an image from a conventional system.
Figure 2:
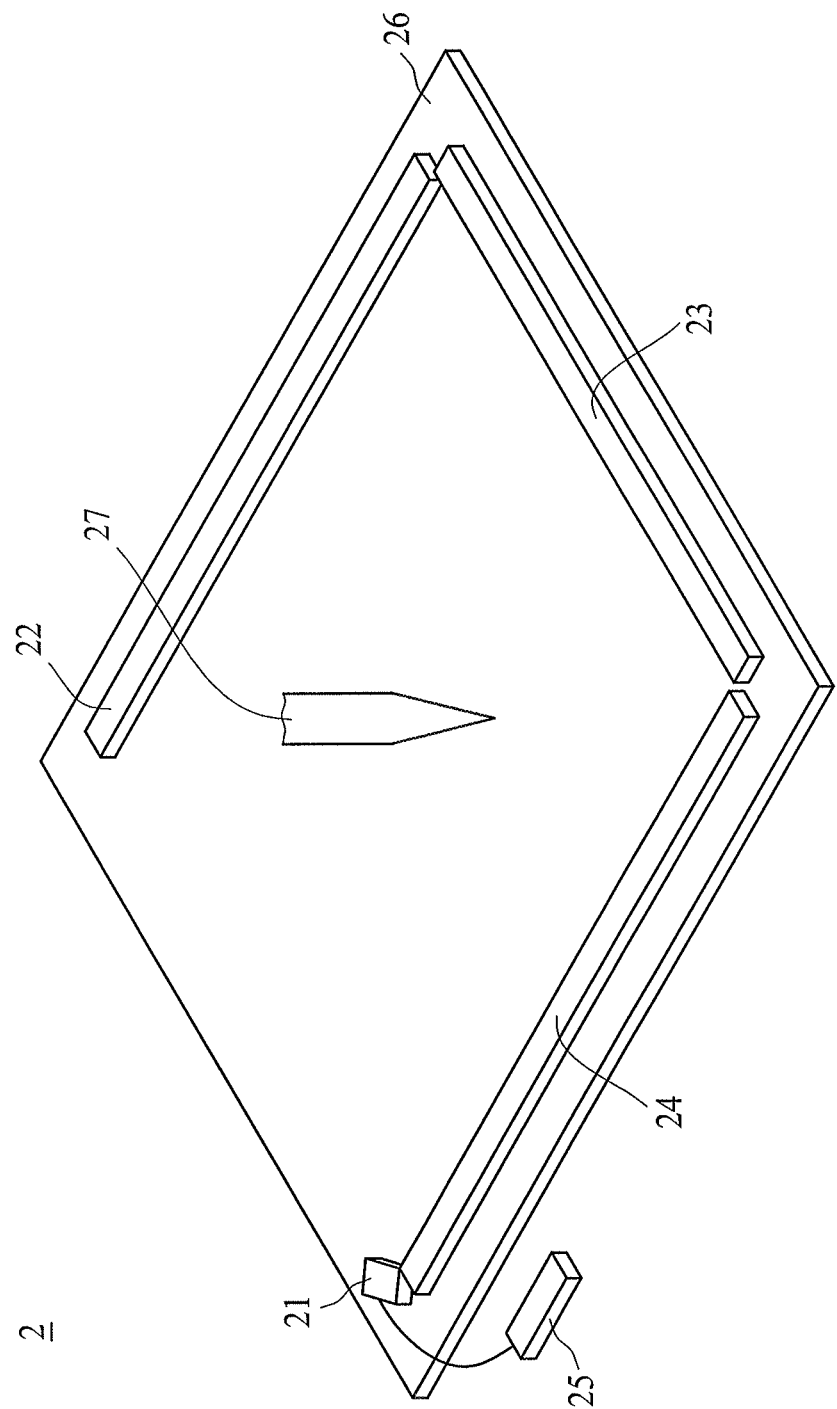
FIG. 2 schematically illustrates an optical touch system according to one embodiment of the present invention.

FIG. 2 schematically illustrates an optical touch system 2 according to one embodiment of the present invention. As shown in FIG. 2, the optical touch system 2 may comprise a sensor 21, a first light-providing member 22, a second light-providing member 23, a third light-providing member 24, and a processing unit 25. The first, second and third light-providing members 22, 23 and 24 define a sensing area on a touch surface 26. The sensor 21 is arranged to detect touch activity in the sensing area. The processing unit 25 is coupled to the sensor 21 and configured to analyze the coordinates of the position where an object 27 is located using an image generated by the sensor 21.

In one embodiment, the first light-providing member 22 comprises a mirror surface, which is configured to face toward the sensing area. The second and third light-providing members 23 and 24 may be a light-emitting device or a light reflecting device, wherein the light emitting device may comprise a plurality of light-emitting diodes that are arranged in order, or a combination of a light guide member and a light emitting diode. The mirror surface of the first light-providing member 22 may generate a mirror image of the object 27 such that the image generated by the sensor 21 may comprise a pattern formed by the object 27 and a pattern formed by the mirror image of the object 27. The patterns formed by the object 27 and the mirror image of the object 27 can be utilized to calculate the included angles between the lines extending through the object 27 and extending through the mirror image of the object 27 and a side of the sensing area, and the include angles and dimensions of the sensing area can be used to calculate the coordinates of the object 27. For details of the method of calculating the coordinates in the present embodiment, please refer to U.S. Pat. No. 7,689,381, which is incorporated herein by reference in its entirety.

Figure 3:
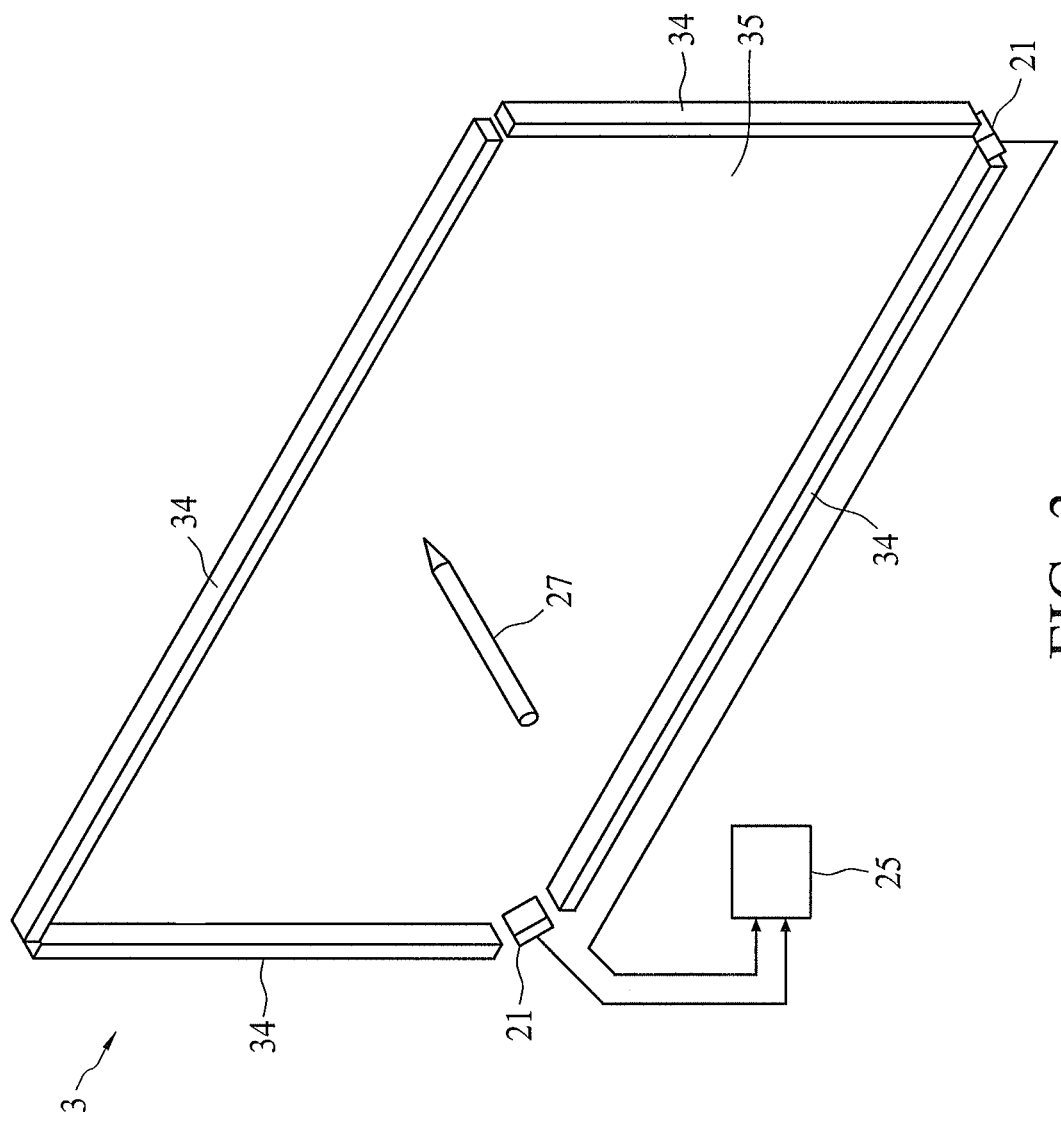
FIG. 3 schematically depicts an optical touch system according to one embodiment of the present invention.

FIG. 3 schematically depicts an optical touch system 3 according to one embodiment of the present invention. As shown in FIG. 3, the optical touch system 3 may comprise two sensors 21 and a processing unit 25 coupled with the two sensors 21. The two sensors 21 are disposed separately. The sensors 21 are configured to sense a sensing area. The processing unit 25 is configured to calculate the coordinates of the position where an object 27 contacts a touch surface 35. The object 27 may comprise a pointer, a fingertip or the like. The periphery of the sensing area may be disposed with a plurality of light-providing members 34, which may comprise a light reflecting device or a light-emitting device.

Referring to FIGS. 2 and 3, the optical touch systems 2 and 3 may be configured such that when the object 27 enters into the sensing area, the object 27 forms either a shadow pattern/image or a pattern/image of reflected light on the sensor(s) 21.

Figure 4:
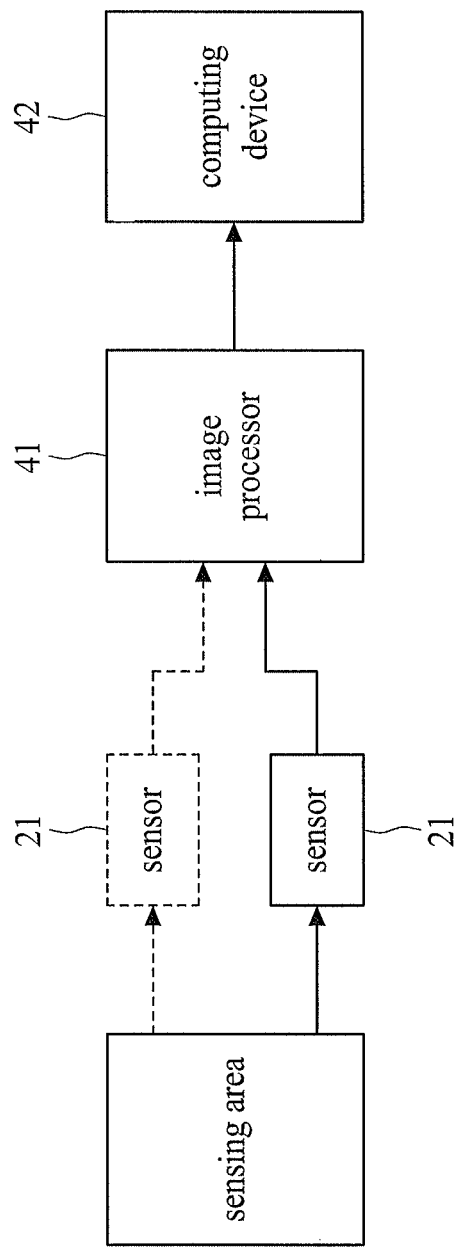
FIG. 4 schematically illustrates a block diagram of an optical touch system according to one embodiment of the present invention.

FIG. 4 schematically illustrates a block diagram of the optical touch system 2 or 3 according to one embodiment of the present invention. Referring to FIGS. 2 through 4, the sensor(s) 21 detect(s) the sensing area. An image processor 41 coupled with the sensor 21 generates images. The image generated by the image processor 41 is transmitted to a computing device (or a processing unit) 42, which can generate a light distribution curve pattern from the image.

Specifically, the image may comprise a plurality of pixels arranged in a matrix-like manner. In one embodiment, the light distribution curve pattern may be such a light distribution curve pattern that extends along a row direction of the image, comprising light intensity values, each of which is obtained by summing up the light intensity values of the pixels of each column of the image. In another embodiment, the light distribution curve pattern may be such a light distribution curve pattern that extends along a column direction of the image, comprising light intensity values, each of which is obtained by summing up the light intensity values of the pixels of each row of the image.

In addition, the light distribution curve pattern may be obtained by other methods. For example, the optical touch system 2 or 3 may generate a background image over the sensing area. Next, when the optical touch system 2 or 3 generates an image, the computing device 42 subtracts the background image from the image so as to obtain the light distribution curve pattern representing the light intensity information of each row or column of the image.

Figure 5:
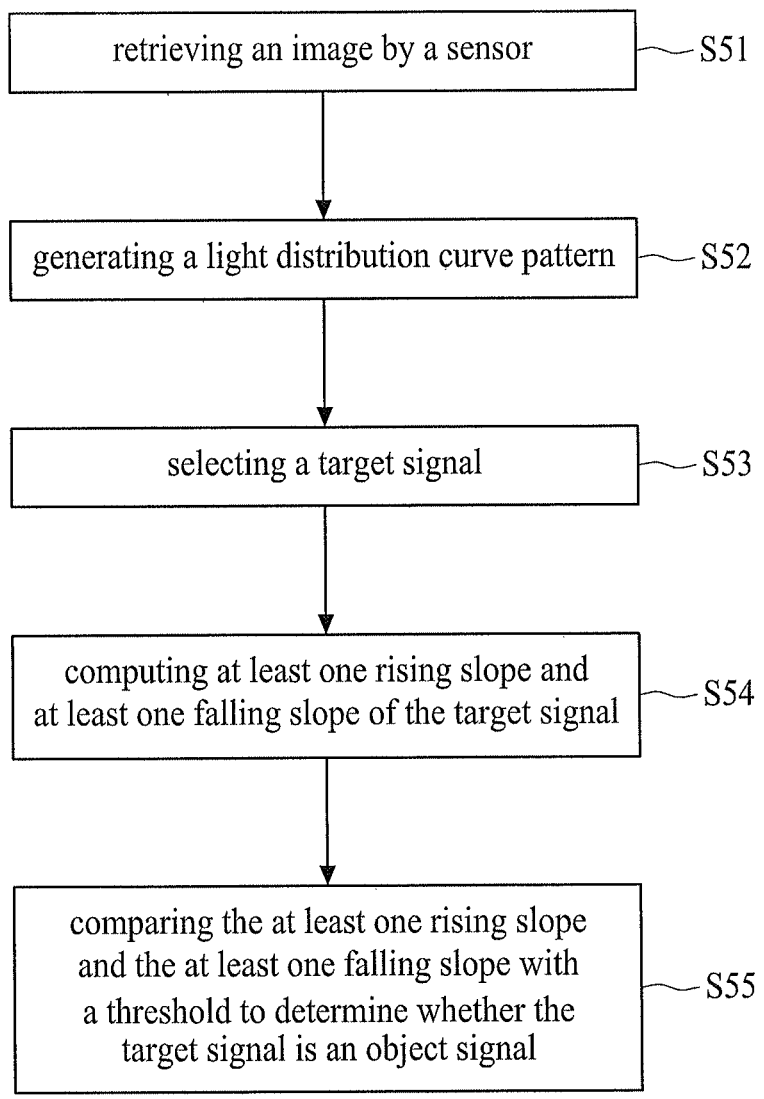
FIG. 5 is a flow diagram showing the steps of an image processing method for an optical touch system according to one embodiment of the present invention.
Figure 8:
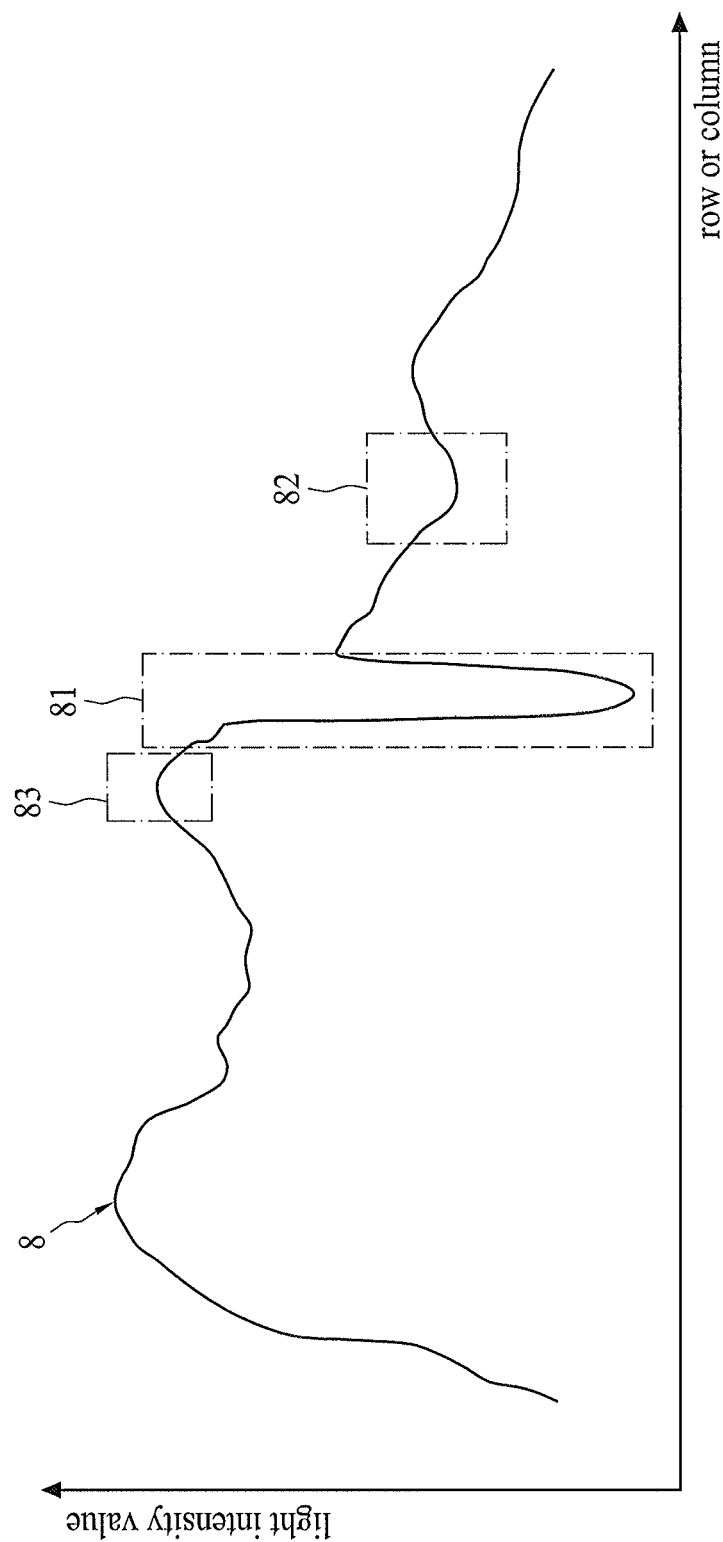
FIG. 8 schematically depicts a light distribution curve pattern according to one embodiment of the present invention.

FIG. 5 is a flow diagram showing the steps of an image processing method for an optical touch system according to one embodiment of the present invention. As shown in FIGS. 5 and 8, in Step S51, a sensor retrieves an image.

In Step S52, the optical touch system generates, according to the image, a light distribution curve pattern 8 representing the image as shown in FIG. 8. In one embodiment, the light distribution curve pattern 8 is the light distribution curve pattern extending along a column or row direction of the image, and the light intensity values of the pixels of each row or column of the image are summed up to obtain a corresponding light intensity value on the light distribution curve pattern 8. In another embodiment, the light distribution curve pattern 8 may also be obtained by subtracting a background image from an image.

In Step S53, a target signal 81 is determined according to light intensity information of the light distribution curve pattern 8 of FIG. 8. In the present embodiment, an object forms a shadow pattern on the sensor, and therefore, the optical touch system selects one signal of the light distribution curve pattern 8 having a light intensity value lower than a corresponding background light intensity value as the target signal 81. In another embodiment, if the object forms a pattern of light reflected on the sensor, the optical touch system selects one signal of light distribution curve pattern 8 having a light intensity value higher than a corresponding background light intensity value as the target signal 81.

Figure 10:
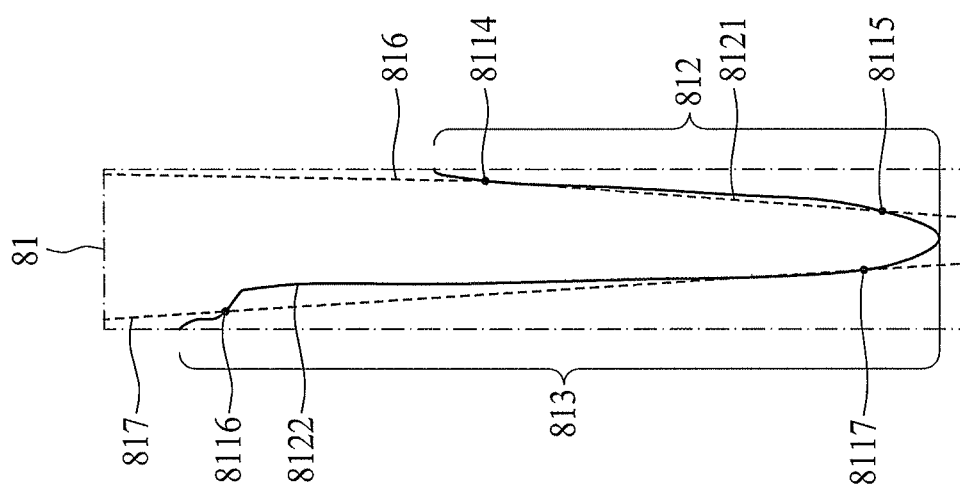
FIG. 10 schematically depicts a target signal according to one embodiment of the present invention.
Figure 13:
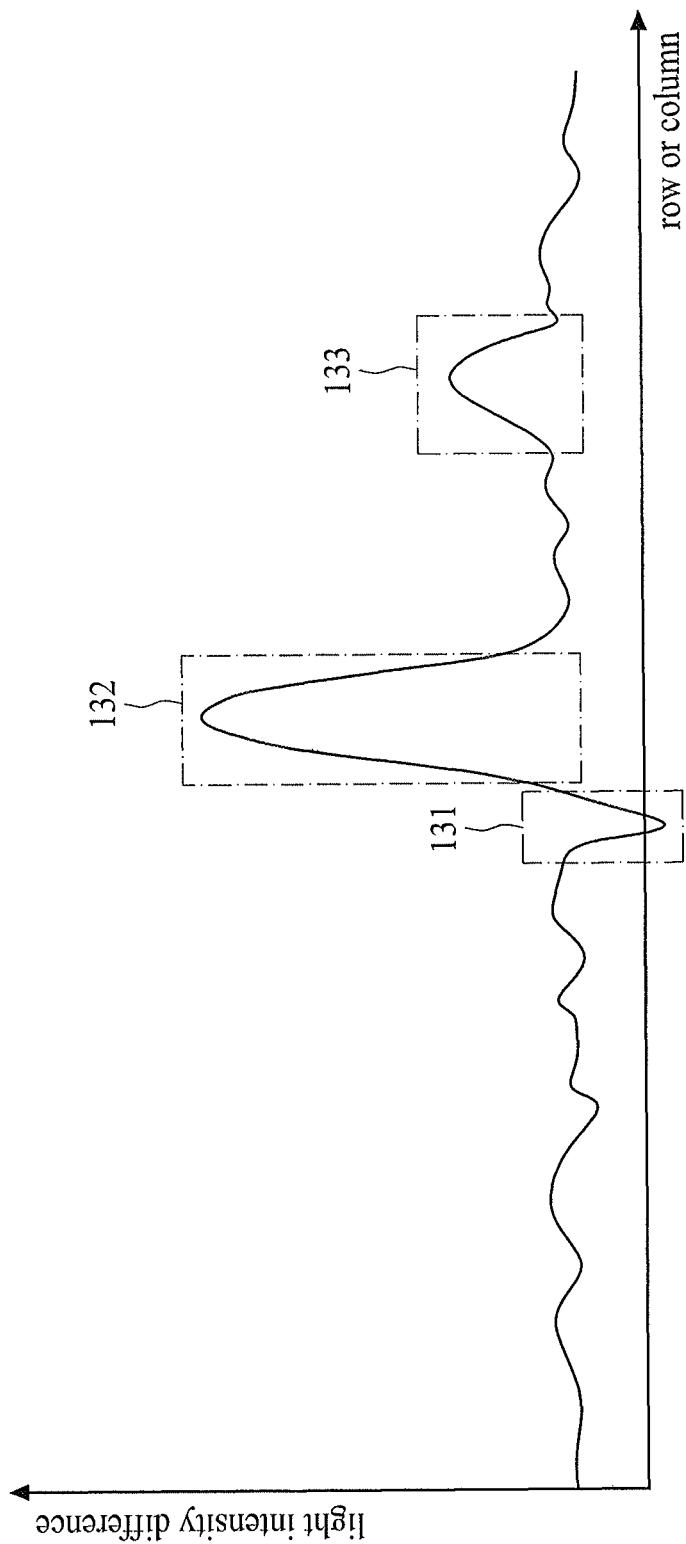
FIG. 13 schematically depicts a light intensity difference distribution pattern that is obtained by subtracting a background light distribution curve pattern from a light distribution curve pattern according to one embodiment of the present invention.

In one embodiment, the selection of the target signal 81 may be determined by the difference between the shadow signal/light reflected signal formed by the object and a background signal. One of the methods initially and respectively obtains an image and a background image. Subsequently, a light distribution curve pattern (as shown in FIG. 8) representing the image and a background light distribution curve pattern (as shown in FIG. 10) representing the background image are obtained. Next, the background light distribution curve pattern is subtracted from the light distribution curve pattern to obtain a light intensity difference distribution pattern as shown in FIG. 13. Finally, significant signals 131, 132 and 133, which significantly stand out among other signals of the light intensity difference distribution pattern, are found. In the present embodiment, the significant signals 131, 132 and 133 correspond to the target signals 83 and 81 and the shadow signal 82 depicted in FIG. 8.

Figure 9:
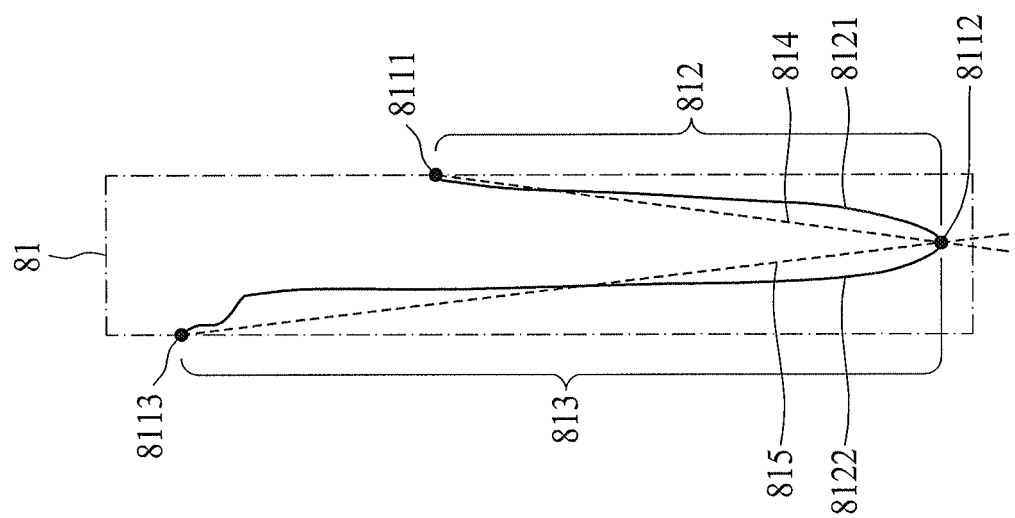
FIG. 9 schematically depicts a target signal according to one embodiment of the present invention.

In Step S54, at least one rising slope and at least one falling slope of the target signal 81 are determined. In the present embodiment, as shown in FIGS. 9 and 10, the target signal 81 may comprise a first section 812 comprising a rising edge 8121 and a second section 813 comprising a falling edge 8122.

The at least one rising slope represents the degree of the steepness of the rising edge 8121. Similarly, the at least one falling slope represents the degree of the steepness of the falling edge 8122. In the present embodiment, the rising edge 8121 and the falling edge 8122 in FIG. 9 are named according to the extending row or column direction defined in FIG. 8; however, the present invention is not limited to such an arrangement. The rising edge 8121 and the falling edge 8122 may be differently named if the definition of the extending row or column direction is changed.

A variety of many methods can be used to calculate the rising slope and the falling slope. A portion of possible methods are illustrated as follows, and the present invention is not limited to the illustrated methods.

In one embodiment, a plurality of points 8111 and 8112 on the first section 812 are selected. Next, a line 814 passing through the points 8111 and 8112 are determined, wherein the slope of the line 814 is a rising slope. Similarly, a plurality of points 8112 and 8113 on the second section 813 are selected. In the present embodiment, the selected points 8111 and 8112 on the first section 812 and the selected points 8112 and 8113 on the second section 813 include a repeated point, the point 8112. Next, a line 815 passing through the plurality of points 8112 and 8113 is determined, wherein the slope of the line 815 is a falling slope.

There are different options to select the points 8111, 8112 and 8113 for determining the lines 814 and 815. Several methods are demonstrated; however, the present invention is not limited to these methods. The point 8111 used to determine the line 814 may be an end point of the target signal 81, or a point adjacent to the end point. The point 8113 used to determine the line 815 may be another end point of the target signal 81, or a point adjacent to the another end point. In the present embodiment, the point 8112 simultaneously used to determine the line 814 and the line 815 may be a midpoint between the two end points of the target signal 81, or a point adjacent to the midpoint. In the present embodiment, the point 8112 simultaneously used to determine the line 814 and the line 815 may be an extreme point, or a point adjacent to the extreme point. When the object 27 forms a shadow pattern on the sensor, the extreme point may be the point having lowest light intensity; while when the object 27 forms a pattern of reflected light on the sensor, the extreme point may be the point having the greatest light intensity.

In another embodiment, referring to FIG. 10, a plurality of points 8114 and 8115 are selected on the first section 812. Next, a line 816 passing through the plurality of points 8114 and 8115 is determined, wherein the slope of the line 816 is a rising slope.

The plurality of points 8114 and 8115 can be any two points on the rising edge 8121. Preferably, the selection of the plurality of points 8114 and 8115 is determined such that the determined line 816 is sloped in a manner substantially similar to the extending manner of the rising edge 8121. The plurality of points 8114 and 8115 are preferably separated from each other. For example, the point 8114 can be a point adjacent to an upper end point of the rising edge 8121, and the point 8115 can be a point adjacent to a lower end point of the rising edge 8121. In another embodiment, the point 8114 can be located on the upper half of the rising edge 8121, and the point 8115 can be located on the lower half of the rising edge 8121. In another embodiment, a transversely extending section exists between the lower end points of the rising edge 8121 and the falling edge 8122, and the point 8115 can be on the transversely extending section, and the point 8114 can be on the rising edge 8121.

In one embodiment, more than two points are selected from the first section 812 to calculate a plurality of lines such that a plurality of rising slopes can be obtained. In another embodiment, the slopes of the plurality of lines are averaged to obtain a rising slope.

Similarly, a plurality of points 8116 and 8117 on the second section 813 are selected. Next, the line 817 passing through the points 8116 and 8117 are determined, wherein the slope of the line 817 is a falling slope.

The plurality of points 8116 and 8117 can be any two points on the falling edge 8122. Preferably, the selection of the plurality of points 8116 and 8117 is determined such that the determined line 817 is sloped in a manner substantially similar to the extending manner of the falling edge 8122. The plurality of points 8116 and 8117 are preferably separated from each other. For example, the point 8116 can be a point adjacent to an upper end point of the falling edge 8122, and the point 8117 can be a point adjacent to a lower end point of the falling edge 8122. In another embodiment, the point 8116 can be located on the upper half of the falling edge 8122, and the point 8117 can be located on the lower half of the falling edge 8122. In another embodiment, a transversely extending section exists between the lower end points of the rising edge 8121 and the falling edge 8122, and the point 8117 can be on the transversely extending section, and the point 8116 can be on the falling edge 8122.

In one embodiment, more than two points are selected from the second section 813 to calculate a plurality of lines such that a plurality of falling slopes can be obtained. In another embodiment, the slopes of the plurality of lines are averaged to obtain a falling slope.

In Step S55, the at least one rising slope and at least one falling slope are compared with a threshold to determine whether the target signal 81 is an object signal. If the absolute value of the at least one rising slope and the absolute value of the at least one falling slope are greater than the threshold, the target signal 81 can be considered as an object signal formed by an object. Next, the coordinates of the object can be determined according to the object signal.

Generally, when an object is in the sensing area, a pattern having light intensity significantly different from background light intensity will be formed on an image. When the image is transformed into a light distribution curve pattern 8, a shadow or light-reflected signal with a significant height will emerge on the light distribution curve pattern 8. Based on such a finding, when a light distribution curve pattern 8 is obtained, the position of an object can be determined by finding the significant shadow or light-reflected signal emerged on the light distribution curve pattern 8.

Figure 11:
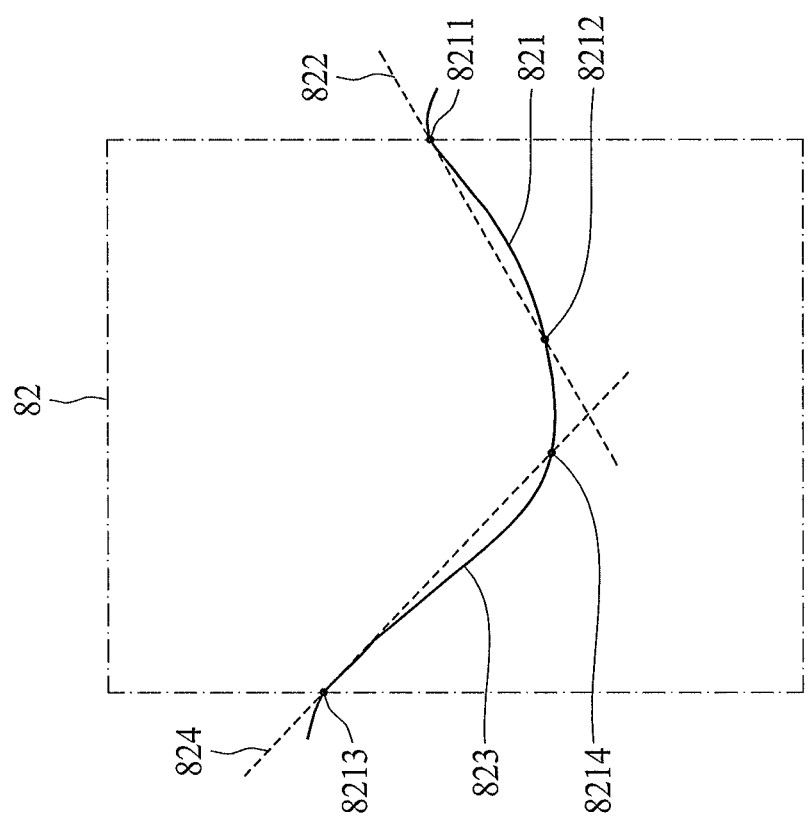
FIG. 11 schematically depicts a shadow signal according to one embodiment of the present invention.

As shown in FIG. 8, in the present embodiment, the light distribution curve pattern 8 comprises a shadow signal 82 with a less significant height. Likewise, as shown in FIG. 11, two points 8211 and 8212 can be selected from a section comprising a rising edge 821, and a line 822 passing through the two points 8211 and 8212 can be determined so as to obtain a rising slope. Two points 8213 and 8214 can be selected from a section comprising a falling edge 823 and a line 824 passing through the two points 8213 and 8214 so as to obtain a falling slope. Because the shadow signal 82 has a less significant height, the absolute values of the rising and falling slopes are small. As such, a threshold can be used as a criterion to discard such type of a signal 82 having less significant height to avoid incorrect determination.

In one embodiment, if the light distribution curve pattern comprises a signal, which includes rising and falling slopes having absolute values less than a threshold, the optical touch system can retrieve a new background image to replace the original background image.

Figure 6:
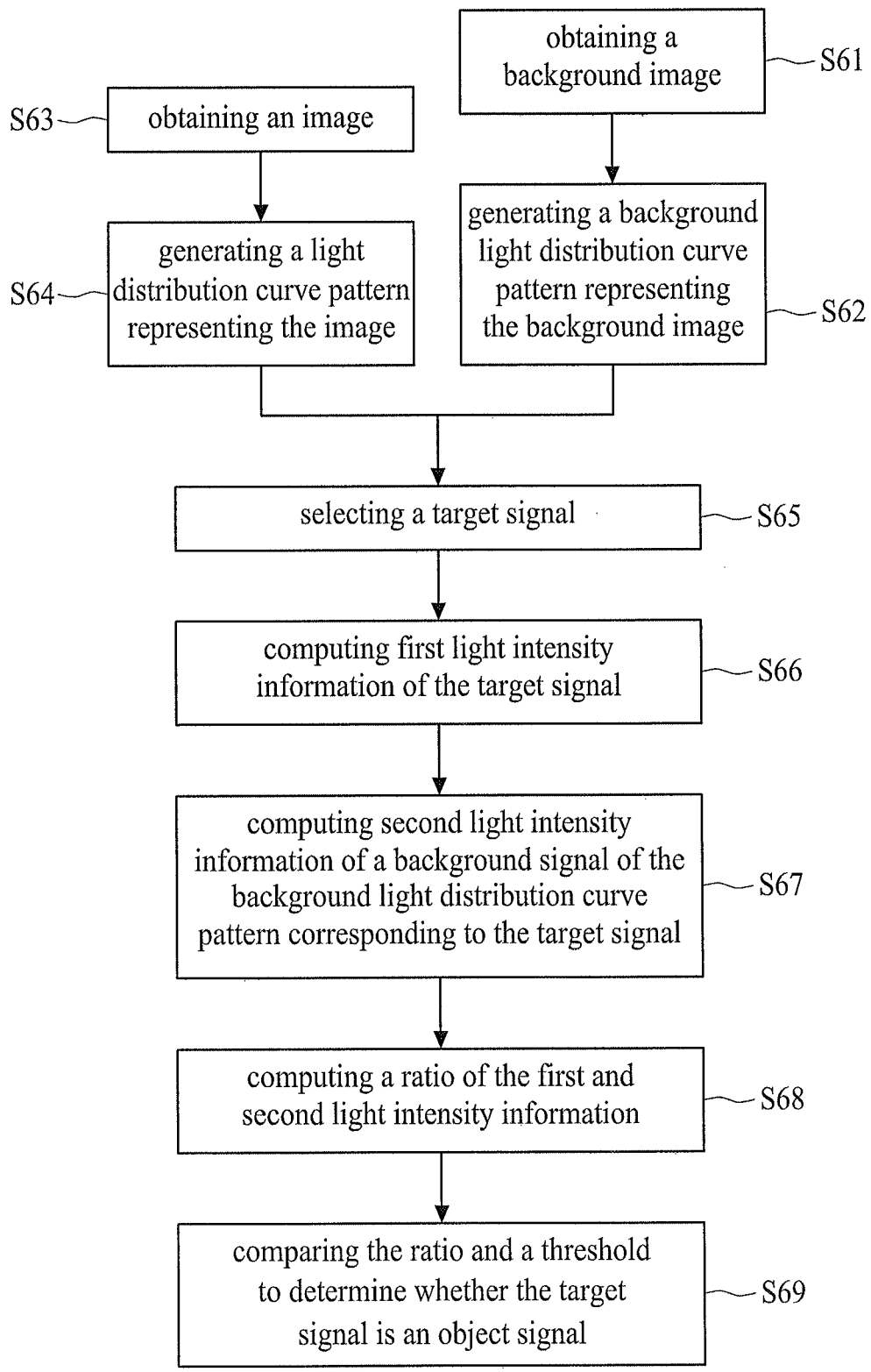
FIG. 6 is a flow diagram showing the steps of an image processing method for an optical touch system according to another embodiment of the present invention.
Figure 12:
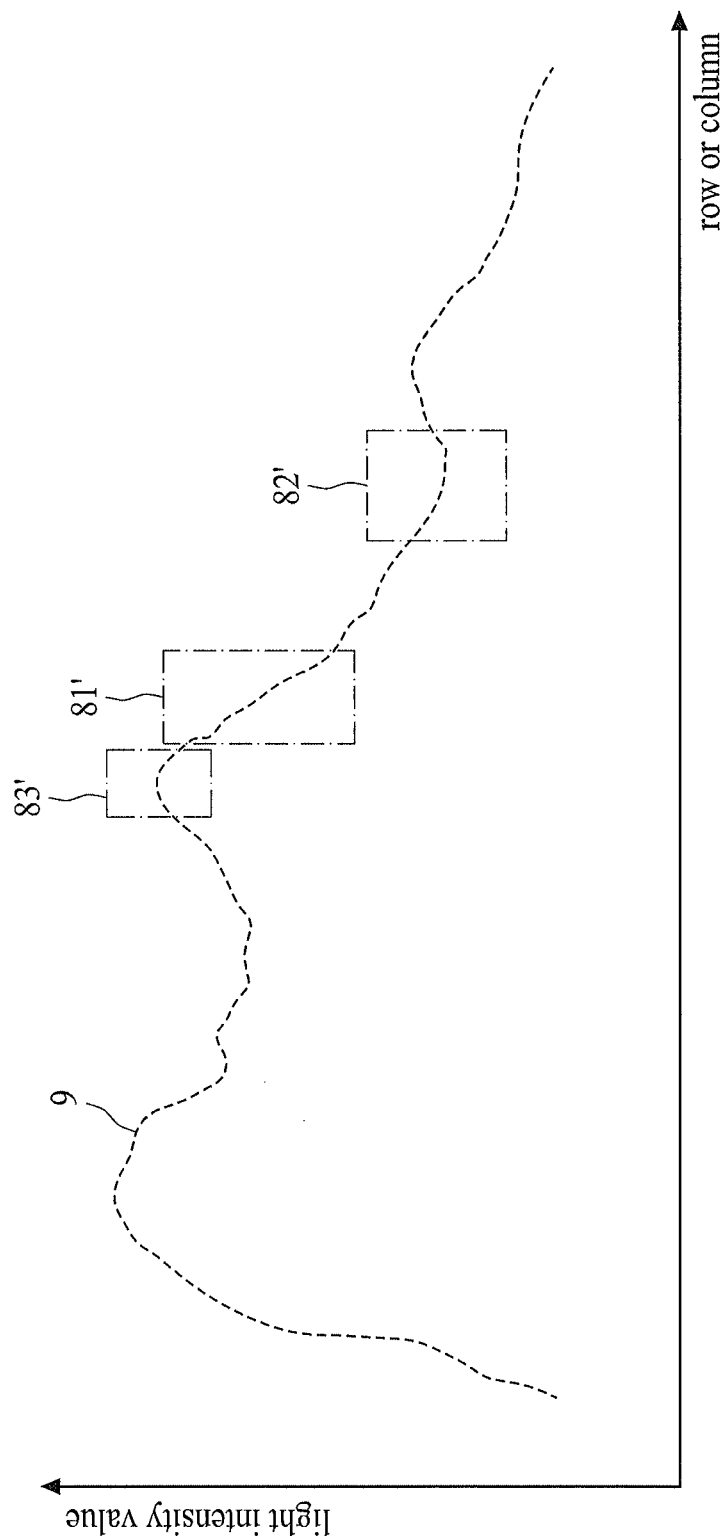
FIG. 12 schematically depicts a background light distribution curve pattern according to one embodiment of the present invention.

FIG. 6 is a flow diagram showing the steps of an image processing method for an optical touch system according to another embodiment of the present invention. Referring to FIGS. 6, 8, and 12, in Step S61, a sensor obtains a background image.

In Step S62, a background light distribution curve pattern 9 as shown in FIG. 12 is generated according to the background image.

In Step S63, the (or a) sensor obtains an image.

In Step S64, a light distribution curve pattern 8 representing the image is generated according to the image, as shown in FIG. 8.

In one embodiment, the light distribution curve pattern 8 or the background light distribution curve pattern 9 is such a light distribution curve pattern extending along a row or column direction, respectively comprising summed-up light intensity values, each of which is obtained by summing up the light intensity values of the pixels of each column or row of the image or the background image. In another embodiment, the background image may be subtracted from the image so as to obtain the light distribution curve pattern representing the light intensity information of rows or columns of the image.

In Step S65, as shown in FIG. 8, a target signal 81 can be determined in accordance with light intensity information of light distribution curve pattern 8 as shown in FIG. 8. Although the target signal 81 is a shadow signal, the present invention is not limited to such an example.

In Step S66, first light intensity information (I1) of the target signal 81 is computed. In one embodiment, the first light intensity information is a sum of the light intensity values of points on the target signal 81. In another embodiment, the first light intensity information is an average light intensity value of the target signal 81.

In Step S67, second light intensity information (I2) of a background signal 81' (FIG. 12) of the background light distribution curve pattern 9 is computed, wherein the background signal 81' corresponds to the target signal 81. In one embodiment, the second light intensity information is a sum of the light intensity values of points on the background signal 81'. In another embodiment, the second light intensity information is an average light intensity value of the background signal 81'.

In Step S68, a ratio (I2/I1) of the second light intensity information (I2) to the first light intensity information (I1) is computed.

In Step S69, the ratio (I2/I1) is compared with a threshold to determine whether the target signal 81 is an object signal. In the present embodiment, the object forms a shadow image on the sensor such that when the ratio (I2/I1) is greater than a threshold, the target signal 81 is considered as an object signal formed by the object.

Alternatively, referring to FIGS. 8 and 12, if the shadow signal 82 and a corresponding background signal 82' (FIG. 12) are compared, a ratio that is less than the threshold will be obtained. Because the ratio is less than the threshold, the shadow signal 82 will not be considered as being generated by an object. In one embodiment, when a ratio of light intensity information of a target signal included in a light distribution curve pattern generated from an image to light intensity information of a corresponding background signal is less than a threshold, the optical touch system may generate a new background image to replace the original background image.

In one embodiment, if the optical touch system is designed to generate a light-reflected image of an object, the target signal will be considered as an object signal when the ratio is less than a threshold. Alternatively, when the ratio is greater than a threshold, the target signal could be a false signal.

Figure 7:
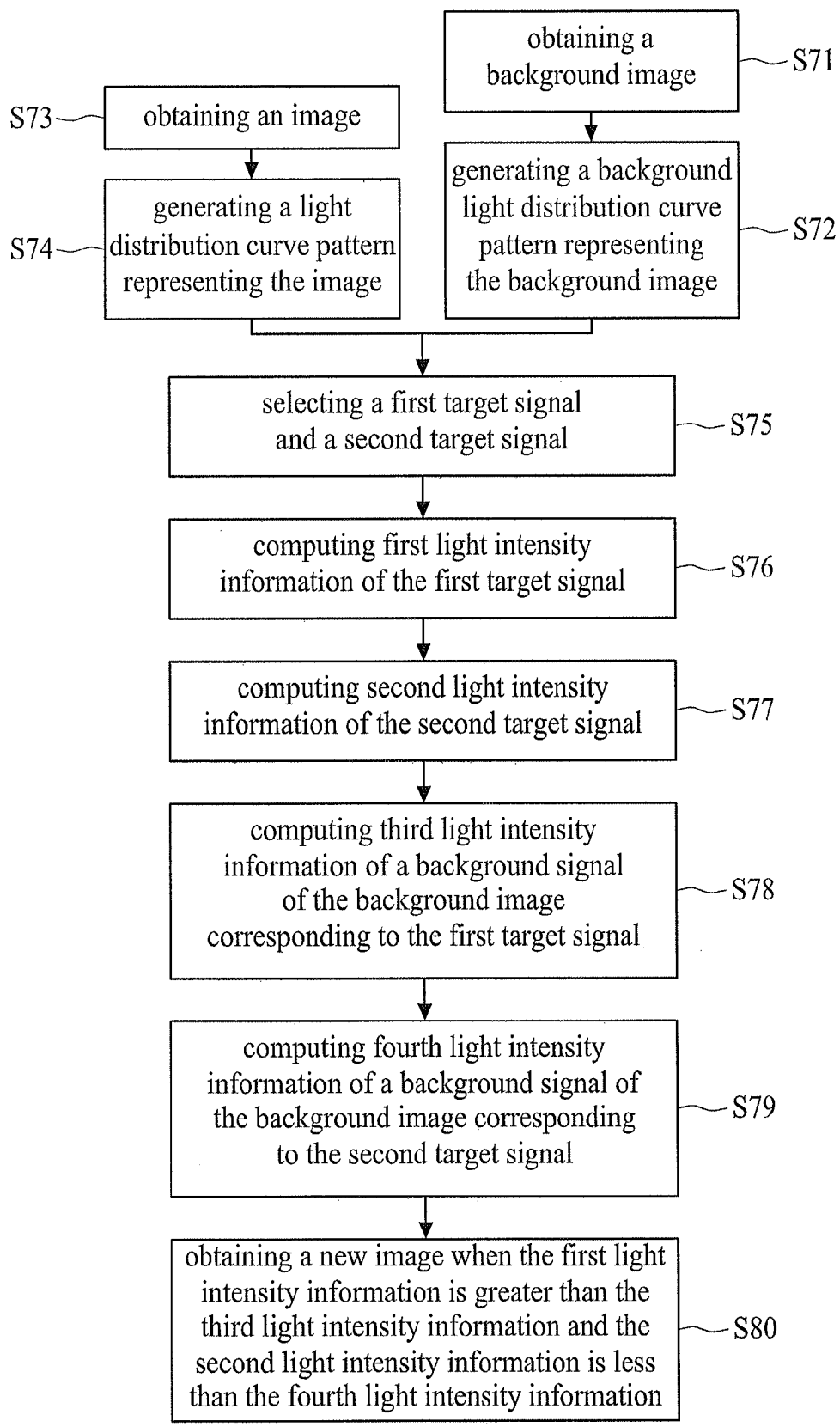
FIG. 7 is a flow diagram showing the steps of an image processing method according to one embodiment of the present invention.

FIG. 7 is a flow diagram showing the steps of an image processing method according to one embodiment of the present invention. Referring to FIGS. 8, 12 and 13, in Step S71, a background image is obtained. In Step S72, a background light distribution curve pattern as shown in FIG. 10, representing the background image is generated. In Step S73, an image is obtained. In Step S74, a light distribution curve pattern as shown in FIG. 8, representing the image, is generated.

In Step S75, a first target signal 81 and a second target signal 83 are selected from the light distribution curve pattern. The first target signal 81 and the second target signal 83 are the portions for which the differences of light intensity between the image and the background image are significant. In one embodiment, a first target signal 81 and a second target signal 83 can be determined by subtracting the background image from the image to obtain a light intensity difference distribution pattern, and then the portions of the light intensity difference distribution pattern, that exhibit significant differences of light intensity are selected.

In Step S76, first light intensity information of the first target signal is computed. In Step S77, second light intensity information of the second target signal is computed.

In Step S78, third light intensity information of a background signal of the background image is computed, wherein the background signal corresponds to the first target signal.

In Step S79, fourth light intensity information of a background signal of the background image is computed, wherein the background signal corresponds to the second target signal.

In Step S80, if the first light intensity information is greater than the third light intensity information and the second light intensity information is less than the fourth light intensity information, then the light distribution curve pattern simultaneously includes a shadow signal and a light-reflected signal. Normally, a light distribution curve pattern should not have a shadow signal and a light reflected signal at the same time. Therefore, when a shadow signal and a light reflected signal simultaneously exist, it is known that the image contains interference noises, and the correctness of the calculation of the coordinates of the object may be adversely affected. Under such a condition, a new image is required.

In one embodiment, if the first light intensity information is greater than the third light intensity information and the second light intensity information is less than the fourth light intensity information, the background image is updated. In some circumstances, the simultaneous presence of both a shadow signal and a light-reflected signal on the light distribution curve pattern may be due to the change of the distribution of background light. Under such a circumstance, a new background image may overcome such an abnormal result.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

It will be apparent to those skilled in the art that various modifications and variations can be made to the disclosed embodiments. It is intended that the specification and examples be considered as exemplary only, with a true scope of the disclosure being indicated by the following claims and their equivalent.

What is claimed is:

1. An image processing method for an optical touch system, comprising the steps of:
   obtaining an image of an object contacting a sensing area of a touch surface by generating a light distribution curve pattern representing light intensity values of light directed at and around the object from a light source;
   determining presence of at least one target signal from the light distribution curve pattern in accordance with the light intensity values from the light distribution curve pattern;
   determining at least one rising slope and at least one falling slope from the light intensity values of the at least one target signal in the light distribution curve pattern, and
   recognizing the at least one target signal as an object signal when absolute values of the at least one rising slope and the at least one falling slope are greater than a threshold.

2. The method of claim 1, wherein the target signal comprises a first section comprising a rising edge and a second section comprising a falling edge, wherein the at least one rising slope is a slope of a first line representing a plurality of points on the first section, and the at least one falling slope is a slope of a second line representing a plurality of points on the second section.

3. The method of claim 2, wherein the plurality of points on the first section comprises an extreme point of the target signal.

4. The method of claim 2, wherein the plurality of points on the second section comprises an extreme point of the target signal.

5. The method of claim 2, wherein one of the plurality of points on the first section is a first end point of the target signal.

6. The method of claim 5, wherein one of the plurality of points on the second section is a second end point of the target signal.

7. The method of claim 6, wherein the plurality of points on the first section comprises a midpoint between the first and second end points.

8. The method of claim 6, wherein the plurality of points on the second section comprises a midpoint between the first and second end points.

9. The method of claim 1, further comprising a step of obtaining a new background image if the absolute value of the at least one rising slope or the absolute value of the at least one falling slope is less than the threshold.

10. The method of claim 1, further comprising a step of summing up light intensity values of pixels of each of columns or each of rows of the image to obtain a light distribution curve pattern of the image extending along a row direction or a column direction.

11. The method of claim 1, further comprising a step of subtracting a background image from the image to obtain the light distribution curve pattern.

12. An image processing method for an optical touch system, comprising the steps of:
   obtaining a background image of a sensing area of a touch surface by generating a background light distribution curve pattern representing light intensity values of light from a light source;
   obtaining an image of an object contacting the sensing area of the touch surface by generating a light distribution curve pattern representing light intensity values of the light directed at and around the object from the light source;
   determining presence of at least one target signal from the light distribution curve pattern of the object image in accordance with light intensity values from the light distribution curve pattern of the object image;
   computing first light intensity values of the target signal;
   computing second light intensity values from the light distribution curve pattern of the background image, corresponding to the target signal; and
   recognizing the at least one target signal as an object signal if a ratio of the first and second light intensity values is greater than a threshold.

13. The method of claim 12, wherein the first and second light intensity information comprises an average light intensity value or a sum of light intensity values.

14. The method of claim 12, further comprising a step of updating the background image if the ratio is less than the threshold.

15. The method of claim 12, wherein the step of selecting the target signal comprises a step of subtracting the background light distribution curve pattern from the light distribution curve pattern.

16. The method of claim 12, further comprising a step of summing up light intensity values of pixels of each of columns or each of rows of the image to obtain a light distribution curve pattern of the image extending along a row direction or a column direction.

17. The method of claim 12, further comprising a step of subtracting the background image from the image to obtain the light distribution curve pattern.

18. An image processing method for an optical touch system, comprising the steps of:

obtaining a background image of a sensing area of a touch surface by generating a background light distribution curve pattern representing light intensity values of light from a light source;

obtaining an image of an object contacting the sensing area of the touch surface by generating a light distribution curve pattern representing light intensity values of the light directed at and around the object from the light source;

determining presence of at least a first target signal and a second target signal from the light distribution curve pattern of the object image in accordance with light intensity values from the light distribution curve pattern of the object image;

computing first light intensity values of the first target signal and second light intensity values of the second target signal;

computing third light intensity values of the background image light distribution curve pattern, corresponding to the first target signal;

computing fourth light intensity values of the background image light distribution curve pattern, corresponding to the second target signal; and obtaining a new image if the first light intensity values are greater than the third light intensity values and the second light intensity values are less than the fourth light intensity values.

19. The method of claim 18, further comprising a step of updating the background image if the first light intensity information is greater than the third light intensity information and the second light intensity information is less than the fourth light intensity information.

20. The method of claim 18, wherein the step of determining a first target signal and a second target signal comprises a step of subtracting the background light distribution curve pattern from the light distribution curve pattern.

21. The method of claim 18, further comprising a step of summing up light intensity values of pixels of each of columns or each of rows of the image to obtain the light distribution curve pattern of the image extending along a row direction or a column direction.

22. The method of claim 18, further comprising a step of subtracting the background image from the image to obtain the light distribution curve pattern.

* * * * *